United States Patent
Pelet

(10) Patent No.: US 9,059,786 B2
(45) Date of Patent: Jun. 16, 2015

(54) INGRESS SUPPRESSION FOR COMMUNICATION SYSTEMS

(75) Inventor: Eric R. Pelet, Saskatoon (CA)

(73) Assignee: Vecima Networks Inc., Victoria, BC (CA)

( * ) Notice: Subject to any disclaimer, the term of this patent is extended or adjusted under 35 U.S.C. 154(b) by 515 days.

(21) Appl. No.: 13/177,733

(22) Filed: Jul. 7, 2011

(65) Prior Publication Data

US 2013/0010810 A1   Jan. 10, 2013

(51) Int. Cl.
| | | |
|---|---|---|
| H04B 1/71 | (2011.01) |
| H04B 1/10 | (2006.01) |
| H04L 25/03 | (2006.01) |
| H04B 1/12 | (2006.01) |
| H04L 25/08 | (2006.01) |

(52) U.S. Cl.
CPC .............. H04B 1/7101 (2013.01); *H04B 1/123* (2013.01); *H04L 25/08* (2013.01); *H04B 1/71* (2013.01); *H04L 25/03267* (2013.01); *H04B 2001/1063* (2013.01); H04B 1/1036 (2013.01); H04L 25/03343 (2013.01)

(58) Field of Classification Search
USPC .......... 370/286, 479, 480, 497; 375/229, 232, 375/233, 345, 346, 350
See application file for complete search history.

(56) References Cited

U.S. PATENT DOCUMENTS

| | | | | |
|---|---|---|---|---|
| 5,742,591 A * | 4/1998 | Himayat et al. | ............... | 370/286 |
| 5,841,809 A * | 11/1998 | Koizumi et al. | ............... | 370/286 |
| 5,926,455 A * | 7/1999 | Allpress | ........................ | 370/210 |
| 6,002,716 A * | 12/1999 | Meyer et al. | ................... | 375/231 |
| 6,256,424 B1 * | 7/2001 | Murakami | ..................... | 382/260 |
| 6,285,718 B1 | 9/2001 | Reuven | | |
| 6,360,369 B1 | 3/2002 | Mahoney | | |
| 6,987,589 B2 * | 1/2006 | Murakami | ..................... | 358/3.27 |
| 7,702,362 B2 * | 4/2010 | Behrens et al. | ............ | 455/553.1 |
| 7,716,712 B2 | 5/2010 | Booth | | |
| 7,826,569 B2 | 11/2010 | Popper | | |
| 7,843,847 B2 | 11/2010 | Quigley | | |
| 8,224,259 B2 * | 7/2012 | Behrens et al. | .................. | 455/73 |
| 8,385,483 B2 * | 2/2013 | Abdelmonem et al. | ....... | 375/346 |
| 8,472,514 B2 * | 6/2013 | Dabiri et al. | ................... | 375/233 |
| 2001/0010704 A1 * | 8/2001 | Schelstraete | .................. | 375/229 |

(Continued)

OTHER PUBLICATIONS

G. Redaelli, et al., "Advanced receiver to dip ingress noise in HFC return channel", ISPACS 2000 Conference Proceedings, 2000.

(Continued)

*Primary Examiner* — Jenee Williams
(74) *Attorney, Agent, or Firm* — Adrian D. Battison; Ade & Company Inc.

(57) ABSTRACT

A method used in the receiver of a communication system is provided to suppress narrow band interferences, known as ingress, that are present in the communication channel, which is shared by a plurality of transmitters each having a channel pre-equalizer, by means of a Time Division Multiple Access (TDMA) scheme or Synchronous Code Division Multiple Access (SCDMA) scheme. The method comprises filtering the interferences using Infinite Impulse Response (IIR) notch filters, and providing IIR all-pass filters devised to compensate for substantially all phase distortions introduced by the notch filters. The method also includes an algorithm to detect the narrow band interferences and an adaptive equalizer to equalize the channel by computing the coefficients of the transmitters' pre-equalizers, and arranged such that the equalization of the channel is isolated from the suppression of the interferences.

18 Claims, 3 Drawing Sheets

(56) References Cited

U.S. PATENT DOCUMENTS

| | | | |
|---|---|---|---|
| 2003/0021367 A1* | 1/2003 | Smith | 375/346 |
| 2003/0076907 A1* | 4/2003 | Harris | 375/350 |
| 2003/0169891 A1* | 9/2003 | Ryan et al. | 381/92 |
| 2003/0202567 A1* | 10/2003 | Yousef et al. | 375/346 |
| 2003/0210171 A1* | 11/2003 | Hager et al. | 342/62 |
| 2004/0247041 A1* | 12/2004 | Biedka et al. | 375/295 |
| 2005/0100105 A1* | 5/2005 | Jensen | 375/259 |
| 2005/0175076 A1* | 8/2005 | Miller et al. | 375/150 |
| 2005/0175353 A1* | 8/2005 | Morgan | 398/149 |
| 2005/0207585 A1* | 9/2005 | Christoph | 381/71.11 |
| 2006/0029153 A1* | 2/2006 | Biedka et al. | 375/295 |
| 2006/0056646 A1* | 3/2006 | Bharitkar et al. | 381/98 |
| 2006/0067429 A1* | 3/2006 | Beyer et al. | 375/309 |
| 2006/0165184 A1* | 7/2006 | Purnhagen et al. | 375/242 |
| 2006/0245474 A1* | 11/2006 | Brunel et al. | 375/146 |
| 2006/0277038 A1* | 12/2006 | Vos et al. | 704/219 |
| 2006/0277039 A1* | 12/2006 | Vos et al. | 704/219 |
| 2007/0118367 A1* | 5/2007 | Dickson et al. | 704/221 |
| 2007/0156800 A1* | 7/2007 | Sturza et al. | 708/300 |
| 2007/0291832 A1* | 12/2007 | Diab et al. | 375/227 |
| 2008/0133631 A1* | 6/2008 | Chen et al. | 708/323 |
| 2008/0137871 A1* | 6/2008 | Hanna | 381/23 |
| 2008/0242244 A1* | 10/2008 | Menkhoff | 455/114.2 |
| 2008/0312891 A1* | 12/2008 | Maruyama et al. | 703/7 |
| 2009/0220112 A1* | 9/2009 | Fincham | 381/302 |
| 2010/0118921 A1* | 5/2010 | Abdelmonem et al. | 375/148 |
| 2010/0189282 A1* | 7/2010 | Bharitkar et al. | 381/97 |
| 2010/0198899 A1* | 8/2010 | Dickson et al. | 708/322 |
| 2012/0013398 A1* | 1/2012 | Dabiri et al. | 327/553 |

OTHER PUBLICATIONS

J.J. Kormylo, et al., "Two-pass recursive digital filter with zero phase shift" IEEE Transactions on Acoustics, Speech, and Signal Processing, Oct. 1974.

M.D. Macleod, "Fast nearly ML estimation of the parameters of real or complex single tones or resolved multiple tones", IEEE Transactions on Signal Processing, Jan. 1998.

A.V. Oppenheim, and, R.W. Schafer, "Discrete-time signal processing", Prentice-Hall, 1st ed, 1989, chap. 10.

* cited by examiner

INGRESS SUPPRESSION FOR COMMUNICATION SYSTEMS

This invention relates to a method for use in a receiver of a communication system for suppressing one or several narrow band interferences present in a communication channel.

BACKGROUND OF THE INVENTION

Narrow band interferences also referred to as Ingress are often present in the return path of cable systems. Ingress noise enters the cable system through defective shields, and couples with the signal. It consists of narrow band signals with power as high as +10 dB over the carrier power and bandwidth typically less than 20 KHz. Sources of ingress include ham radio transmissions and therefore can be intermittent. Ingress may slowly drifts in frequency. Channel impairments also include channel amplitude and phase distortions, burst/impulse noises, and thermal noises.

Cable Modems (CMs) use the return path to transmit short signals, referred to as bursts, to the Cable Modem Termination System (CMTS) located at the head end. The Media Access Control (MAC) layer of the CMTS uses Time Division Multiple Access (TDMA) or Synchronous Code Division Multiple Access (S-CDMA) to control the access to the return path by the CMs, and avoid burst collisions. Transmissions occur inside time slots. The CMs must start transmitting their bursts early enough so they reach the CMTS at the time slots that were allocated to them. The CMTS synchronizes to the incoming bursts prior to extracting the data. Synchronization is facilitated by means of a preamble. The preamble represents a sequence of symbols that is known to the CMTS.

To facilitate inter-operability between CMTS and CMs, a Standard known as Data Over Cable Service Interface Specification (DOCSIS) and which is employed by many cable operators, was developed to define the communication protocols between CMTS and CMs. In DOCSIS, two modes of operations are used in the return path: ranging and traffic modes. Ranging is used when a CM joins the network and also for periodic maintenance. The process of ranging is similar for TDMA and S-CDMA modes, except that timing synchronization requires higher accuracy in S-CDMA. If TDMA is selected, a CM which has ranged successfully enters the traffic mode to transmit TDMA bursts. Similarly, if S-CDMA is selected, a CM which has ranged successfully enters the traffic mode to transmit S-CDMA bursts.

Different preambles are used in ranging and traffic modes. In ranging mode the preamble is inserted at the beginning of the burst, and includes a sync sequence and a training sequence. The sync sequence is used by the CMTS to detect the start of the burst, recover timing, measure the signal level, and correct for phase and frequency offsets. The training sequence is used for equalizing the channel. During the ranging mode, the CMTS processes the received burst transmitted by the CM to both measure the CM synchronization parameters (i.e., power level, carrier frequency and timing offsets), and compute the coefficients of the CM pre-equalizer. Following processing of the burst, the CMTS transmits the information back to the CM using the downstream channels, so the CM can adjust its synchronization parameters and configure its pre-equalizer before transmitting a new burst in the return path (i.e., upstream channels). Pre-equalization at the CM allows to cancel the effect of the channel at the CMTS. The CMTS informs the CM to operate in traffic mode when the received burst is determined to be of sufficient quality for communicating in TDMA or S-CDMA, whichever modes has been selected. CMs periodically return to ranging for adjustments of the pre-equalizer coefficients and/or synchronization parameters.

In TDMA traffic mode, the preamble is inserted at the beginning of the burst, and consists of a sync sequence, that is used to estimate residual timing offset, phase offset and signal level. In S-CDMA traffic mode, the preamble is interleaved with the data, and is used to estimate phase offset and signal level.

Since ingress does not depend on which CM transmits, it is natural to suppress the narrow band interferences (i.e., ingress) at the CMTS, so in the receiver. There are several methods to suppress the narrow band interferences. One method uses a prediction filter to extract the interferences so they can be subtracted from the communication signal. A prediction filter is an adaptive FIR notch filter whose coefficients can be adjusted using a gradient algorithm such as for example the Least Mean Square (LMS) algorithm. The prediction filter coefficients are usually adjusted when no CM transmits so only ingress noise and broadband noises are present in the channel, or in other words, there is no communication signal. The coefficients are kept unchanged when the CMs transmit. There is provision in the DOCSIS Standard to reserve time slots when no CM transmits to allow adjustments of the prediction filter coefficients.

The suppression of interferences using a prediction filter when the communication signal is present causes distortions to the communication signal. A Decision Feedback Equalizer (DFE) can be used to compensate for the distortions introduced by the prediction filter.

An alternative technique to suppress ingress noise is to use an Infinite Impulse Response (IIR) notch filter instead of an FIR notch filter, IIR notch filters can filter interferences with significantly less coefficients than their FIR counterparts.

IIR notch filters can cause severe distortions to the communication signal, while suppressing the interferences. As in the case of an FIR filter, a DFE can be used to compensate for the signal distortions introduced by the notch filter, as described in the paper by G. Redaelli, et al.:"Advanced Receiver to Dip Ingress Noise in HFC Return Channel", ISPACS 2000 conference proceedings.

The cascade of an IIR/FIR notch filter and a DFE is an effective solution to suppress narrow band interferences but has two main problems. Problem 1: Synchronization to the burst signal is required for the DFE to properly operate, however high-power interferences mask the burst signal and must be notched in order to synchronize. Notching the interferences causes severe distortions to the burst, which adds to the distortions caused by the channel. This plurality of distortions renders synchronization very complex to achieve. Problem 2: The DFE simultaneously compensates for both channel distortions and distortions caused by the notch filter. This is expensive to implement as different DFE coefficients are needed for each CM, since channel distortions depend on which CM transmits. Also, the DFE coefficients must be re-computed for each CM every time the interferences change, which adds significant overhead to the system.

An effective approach to solve problem 1 is to "build" a notch filter that minimizes distortions to the communication signal in order to synchronize. Distortions introduced by an IIR notch filter are mostly phase distortions. A method was proposed to build a zero phase shift IIR notch filter (i.e., a filter which only causes amplitude distortions to the signal) in the paper by J. J. Kormylo, et al., "Two-Pass Recursive Digital Filter with Zero Phase Shift", IEEE transactions on acoustics; speech, and signal processing, October 1974. As described in Kormylo's paper, a zero phase shift IIR notch filter can be built from a conventional IIR notch filter by performing a two-pass filtering of the received burst signal through the conventional IIR notch filter, the first pass occurring in the forward direction as the burst signal is received and the second pass in the time reverse direction after receiving the full burst and storing the notch filter output in a memory so it can be read backward from the memory. The output of the second-pass filtering is also stored in memory, since it has to be read backward again for processing the burst. This method is quite expensive and time consuming since it requires two times buffering of the complete burst before the burst can be processed to recover the data.

An effective approach to solve problem 2 is to isolate/decouple channel equalization from the suppression of interferences. A solution was proposed in the case of a prediction filter in cascade with a DFE in U.S. Pat. No. 7,843,847 (Quigley) issued November 2010 to Broadcom. The coefficients of the prediction filter are adjusted when no CM transmits so only when narrow band interferences are present in the channel. A DFE comprises a feedforward equalizer and a feedback equalizer. The feedback equalizer is used to compensate for the distortions introduced by the prediction filter. This is achieved by setting the feedback equalizer coefficients equal to those of the prediction filter coefficients. The feedforward equalizer is solely used to compensate for the channel distortions. The coefficients of the feedforward equalizer are adjusted during the ranging mode, while feedback equalizer and prediction filter coefficients are kept unchanged. This mechanism allows to decouple channel equalization from ingress noise removal in the case of a FIR notch filter in cascade with a DFE. The coefficients of the feedforward equalizer are sent to the CM for configuration of its pre-equalizer.

The following references are relevant to this field:

U.S. Pat. No. 7,843,847 (Quigley) issued November 2010 to Broadcom Corporation discloses a number of features for enhancing the performance of a communication system, in which data is transmitted between a base station and a plurality of subscriber stations located different distances from the base station. The power transmission level, slot timing, and equalization of the subscriber stations are set by a ranging process. Data is transmitted by the subscriber stations in fragmented form. Various measures are taken to make transmission from the subscriber stations robust. The uplink data transmission is controlled to permit multiple accesses from the subscriber stations U.S. Pat. No. 7,826,569 (Popper) issued May 2010 to Juniper Networks, Inc. discloses a device for reducing ingress noise in a digital signal, comprising a noise predictor for predicting an amount of ingress noise in the digital signal based on past samples of the ingress noise, and a subtractor for subtracting the predicted amount of ingress noise from the digital signal. Channel distortion is compensated for by a noise-independent equalizer, such as a ZF equalizer, placed upstream of the noise predictor. The device may be incorporated, for example, in a cable modem termination system (CMTS) of an hybrid fiber/coax (HFC) network.

U.S. Pat. No. 7,716,712 (Booth) issued May 2010 to General Instrument Corporation discloses an adaptive data stream filter which removes narrowband interference from the CATV return path prior to these paths being combined in the network. This provides a method for removing narrowband interference from the CATV return path which detects potential narrowband interference in real-time and adapts a filter to remove this potential narrowband interference. The method uses previously created filters that are combined based on detected interference in an adaptive manner to continually adapt to new interference sources. Another embodiment calculates new filter coefficients for the data stream filter based on detected interference. In another embodiment, two filters are operated in a ping-pong manner for each band of interference identified as above threshold. This enables updating of one filter while another filter is performing the data stream filter operation U.S. Pat. No. 6,360,369 (Mahoney) issued March 2002 to Broadcom Corporation discloses a system for the removing of interference (ingress) in cable modems without reducing the data rate or changing the frequency of the signal. A variable band stop filter bank and a non-linear equalization system are used. The band stop filter bank removes ingress while the equalization system, comprising an inner and an outer equalizer, removes the distortion created by the band stop filtering. A spectrum monitor detects both the presence of ingress and its frequency, and then feeds the data to a digital signal processor which calculates the distortion removal settings for the equalizers.

U.S. Pat. No. 6,285,718 (Reuven) issued September 2001 to Orckit Communication Ltd discloses an apparatus for transmission of high speed data over communication channels including a modulator which modulates an outgoing stream of digital data to generate an outgoing signal, and a demodulator which demodulates an incoming signal to generate an incoming stream of digital data, wherein the modulator comprises a band suppressor for suppressing portions of the outgoing signal which have specified frequencies.

G. Redaelli, et al., "Advanced receiver to dip ingress noise in HFC return channel", *ISPACS* 2000 *conference proceedings,* 2000

J. J. Kormylo, et al., "Two-pass recursive digital filter with zero phase shift", *IEEE transactions on acoustics, speech, and signal processing*, October 1974

M. D. Macleod, "Fast nearly ML estimation of the parameters of real or complex single tones or resolved multiple tones", *IEEE Transactions on Signal Processing*, January 1998

A. V. Oppenheim, and, R. W. Schafer, "Discrete-time signal processing", Prentice-Hall, 1st ed, 1989, chap, 10

The disclosure of each of the above documents is hereby incorporated by reference.

SUMMARY OF THE INVENTION

According to one aspect of the present invention, the prior art of generating a zero-phase shift IIR notch filter is made simpler by devising an IIR all-pass filter to compensate for nearly all phase distortions introduced by the notch filter. This solution eliminates the need to buffer the signal.

According to another aspect of the present invention, the IIR all-pass filter was devised to require a relatively small number of hardware resources, which makes it suitable for implementation in a Field Programmable Gate Array (FPGA) or an Application Specific Integrated Circuit (ASIC). In a preferred embodiment of this invention, only 5 multipliers and 21 adders are required to implement the all-pass filter.

According to still another aspect of the present invention, a method is proposed to isolate/decouple the equalization of the channel from the suppression of the interferences.

According to still another aspect of the present invention, an algorithm is provided to detect the narrow band interferences and configure the IIR filters to suppress the detected interferences.

DETAILED DESCRIPTION

Figure 1:
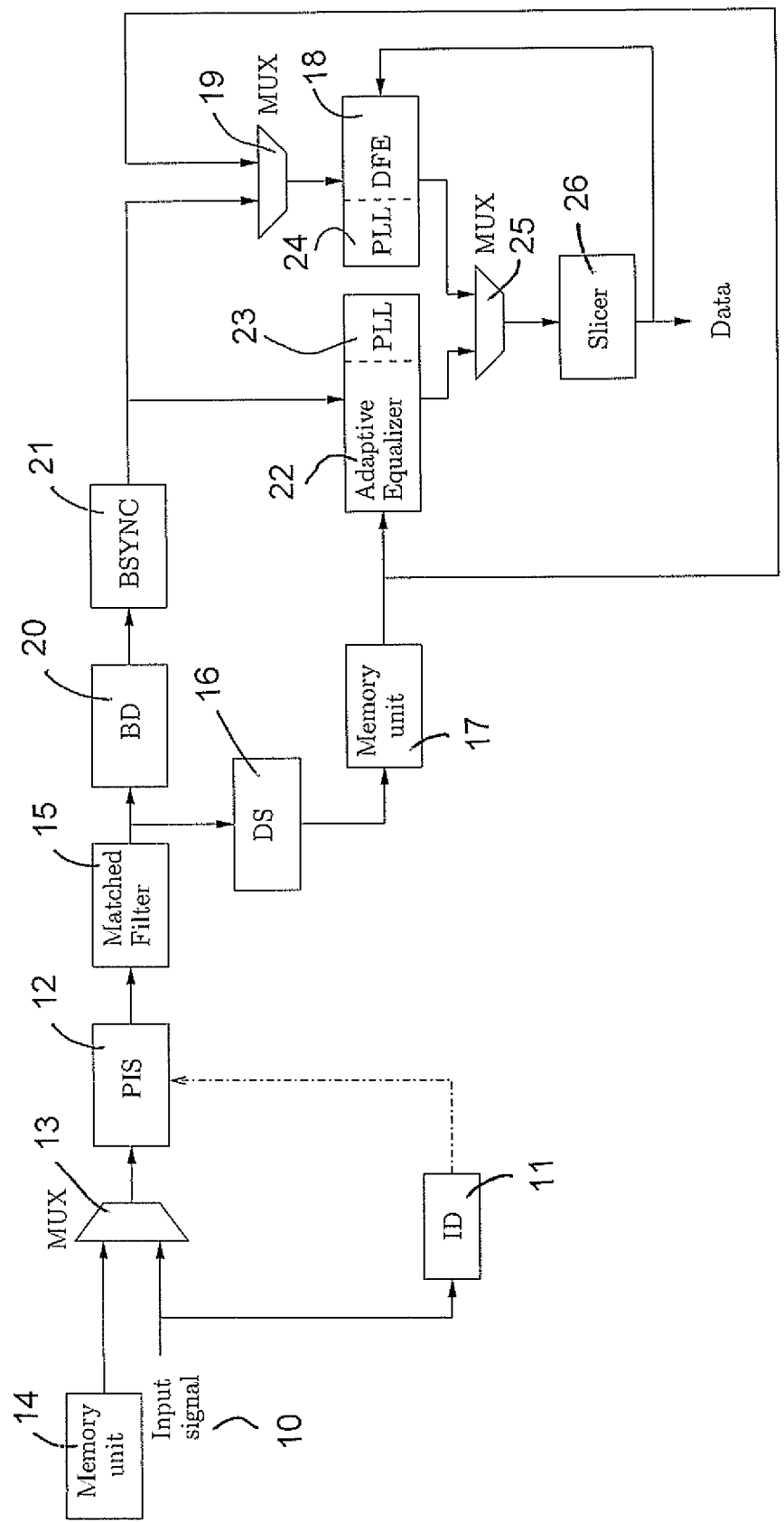
FIG. 1 is a block diagram of a preferred embodiment of the invention which provides a method to suppress the narrow band interferences in the receiver during the TDMA/S-CDMA ranging modes and the TDMA traffic mode including components arranged to detect the interferences present in the channel during idle times, synchronize to the incoming bursts during the TDMA/S-CDMA ranging modes, compute the pre-equalizer coefficients during the TDMA/S-CDMA ranging modes, recover the data during the TDMA/S-CDMA ranging modes, synchronize to the incoming bursts during the TDMA traffic mode, and recover the data during the TDMA traffic mode.

Referring to the block diagram in FIG. 1, the input indicated at Input signal 10, represents the received digital Quadrature Amplitude Modulated (QAM) baseband signal at the sampling rate, where the sampling rate is typically 4 times the symbol rate. This signal is normally obtained by sampling the RF received signal and performing filtering and down-conversions operations which are not shown in FIG. 1. Input signal 10 is fed to the Interference Detection (ID) block 11 and Programmable Interference Suppressor (PIS) block 12 by means of Mux indicated at 13. The ID block 11 is active when no CM transmits and the channel is idle. There is provision in the DOCSIS Standard to prevent CMs from transmitting during arbitrary period of times. These periods of times are referred to in the standard as idle times (see DOCSIS 3.0—MAC and Upper Layer Protocols Interface Specifications).

At the start of an idle time, the ID block 11 processes the input signal to estimate center frequencies, bandwidths and powers of the interferences present in the channel. No CM transmits during an idle time, so the input signal only consists of the interferences. Detection and characterization of the interferences are performed using an algorithm described as follows. It is an iterative algorithm wherein one of the interferences is detected at a time, then an IIR notch filter in PIS 12 is configured to filter the received signal and suppress the detected interference, then a power measurement of the filtered signal is performed to determine whether interferences are still present and if it is the case, the search for one of the remaining interferences is started again on the filtered signal. Detection and characterization of an interference are performed as follows. It is a multi-stage process. In the first stage, several FFTs of size M1 with M1 integer are computed, and powers and center frequencies of possible interferences are computed at each bin of each measurement by using a frequency interpolation technique. There are several known frequency interpolation techniques. A suitable technique is as described in the paper by M. D. Macleod, "Fast nearly ML estimation of the parameters of real or complex single tones or resolved multiple tones", *IEEE Transactions on Signal Processing*, January 1998. The power estimates are processed to select a slice of the frequency band, which is determined to contain at least one of the interferences. This portion of the frequency band is extracted by filtering and down-sampling operations. The down-sampling operation increases the frequency resolution and allows to compute better power and center frequency estimates in the next stage.

Following down-sampling of the communication signal by an integer L1, the second stage consists of computing as in the first stage several FFTs of size M2 with M2 integer (where M2 may be equal to M1) of the down-sampled signal, computing power and center frequencies of possible interferences at each bin of each measurement, and processing the power estimates to select a narrower slice of frequencies within the slice selected in the first stage. This narrower slice is extracted by filtering and down-sampling of the signal by an integer L2 (where L2 may be equal to L1). Additional stages similar to stage 1 and 2 may be used to further "zoom-in" on the signal spectrum, and this until one of the interferences is detected and its bandwidth is estimated. A final measurement of the center frequency and power of the detected interference is computed by up-sampling by U with U integer the down-sampled signal which contains the detected interference, and taking several FFTs of size M, and computing by frequency interpolation accurate center frequency and power estimates for this interference.

As illustrated in FIG. 1 by the dashed arrow joining ID 11 to PIS 12, the detection and characterization of the interferences by ID 11 involved configuring as many IIR notch filters in PIS 12 as there are interferences to suppress. Configuration of the notch filters consists of selecting pre-computed values for the coefficients; selection which is based on the bandwidth and power estimates computed by ID 11. A same number of all-pass filters are then configured by selecting the pre-computed values associated with the values that were selected for the IIR notch filters.

Several other activities occur during an idle time in addition to detecting and characterizing the interferences. Following configuration of the PIS notch and all-pass filters, the output of memory unit indicated at 14 is passed to the PIS block 12 by means of mux 13. Memory unit 14 outputs a reconstructed baseband signal at the sampling rate of the training sequence of the preamble. U1 output is filtered by PIS 12 and matched filter 15, which is the filter matched to the signaling pulse, before being down-sampled to the symbol rate using the Down-Sampler (DS) block 16. This down-sampled signal is essentially the preamble training sequence after being distorted by the PIS block 12. This "distorted" training sequence is stored in a memory unit indicated at 17, from which it is passed to a Decision Feedback Equalizer (DFE) block 18 by means of a mux 19 to train the DFE on this newly configured PIS block 12. The main purpose of the DFE 18 is to compensate for the distortions introduced by the PIS block 12 to the communication signal. The DFE 18 is trained using for example the LMS algorithm. The desired signal to train the DFE is the actual training sequence of the preamble. Training the DFE may require to repeatedly feed the distorted training sequence to the DFE. This is achieved by cycling several times through memory unit 17. The DFE coefficients obtained are stored in memory for use when the communication signal is present. The input signal 10 is connected back to the PIS block 12 by means of mux 13 upon complete processing of the signal stored in memory 14.

Still referring to FIG. 1, an idle time is followed by an activity period during which CMs are allowed to transmit. The PIS block 12 is not reconfigured during an activity period, and the coefficients of its notch and all-pass filters remain the same. The duration of an activity periods depends on how long the PIS block 12 can successfully suppress the interferences without changing its configuration. This depends on the frequency drift of the interferences, and the rate at which new interferences appear. The intermittent disappearance/reappearance of the interferences that are currently filtered by the PIS is not an issue, since these interferences are strongly notched by the PIS block 12.

Again referring to FIG. 1, two types of bursts are received during an activity period: ranging bursts and traffic bursts. Ranging bursts are fed to the PIS block 12, then the matched filter 15, then a Burst Detection (BD) block 20 which detects the start of the burst by processing the preamble, and then the Burst SYNChronization (BSYNC) block 21 which recovers timing, measures/adjusts the signal level, provides coarse estimates of frequency and phase offsets, digitally re-samples the signal, down-samples the resampled signal to the symbol rate, and de-rotates the down-sampled signal using the coarse frequency and phase estimates. The de-rotated symbols corresponding to the training sequence are passed to the Adaptive Equalizer 22, which is used to compute the coefficients of the pre-equalizer in the transmitter. The desired signal to train the adaptive equalizer is the distorted training sequence provided by memory unit 17. Using this sequence as opposed to the actual training sequence, allows the system to isolate/decouple the equalization of the channel from the suppression of the interferences. The LMS algorithm may be used to train the adaptive equalizer 22. A Phase-Locked Loop (PLL) indicated at 23, which is internal to the adaptive equalizer, compensates for residual frequency offsets. The computed values for the coefficients of the adaptive equalizer are transmitted to the CM so the CM may configure its pre-equalizer.

The payload of the ranging burst may be extracted using the output of the adaptive equalizer 22, in which case the output is passed to the slicer 26 to recover the QAM data, by means of mux 25. Also, the coefficients of the adaptive equalizer are kept unchanged during reception of the payload, and the PLL 23 corrects for residual frequency offsets.

The output of the adaptive equalizer 22 may not be sufficiently reliable for properly detecting the payload, especially in the early stages of ranging. The DFE block 18 may then be used in place of the adaptive equalizer 22 to extract the payload. In this case, the output of the BSYNC block 21 is fed to the DFE block 18 by means of Mux 19, and its coefficients are reset to the values obtained by training the DFE 18 in the idle time that preceded this activity period. The coefficients of the DFE 18 get adjusted using the LMS algorithm during reception of the preamble training sequence so the DFE also compensates for the distortions introduced by the channel. The output of the DFE is passed to the slicer 26 by means of mux 25. A PLL indicated at 24, which is internal to the DFE, is used to correct for residual frequency offsets.

Still referring to FIG. 1, TDMA traffic bursts are handled as follows. Traffic bursts are passed to the PIS 12, then the matched filter 15, then the BD 20 and BSYNC blocks 21. The adaptive Equalizer 22 is not used in traffic mode. The DFE 18 may or may not be used. If the DFE 18 is used, then its coefficients are reset to the values obtained by training the DFE in the idle time that preceded this activity period. The DFE coefficients may be adjusted during reception of the payload by using the LMS algorithm in decision-directed mode. If the DFE 18 is not used, then its feedforward linear filter may be used in decision-directed mode in combination with the LMS algorithm to compensate for timing drift during reception of the burst.

Figure 2:
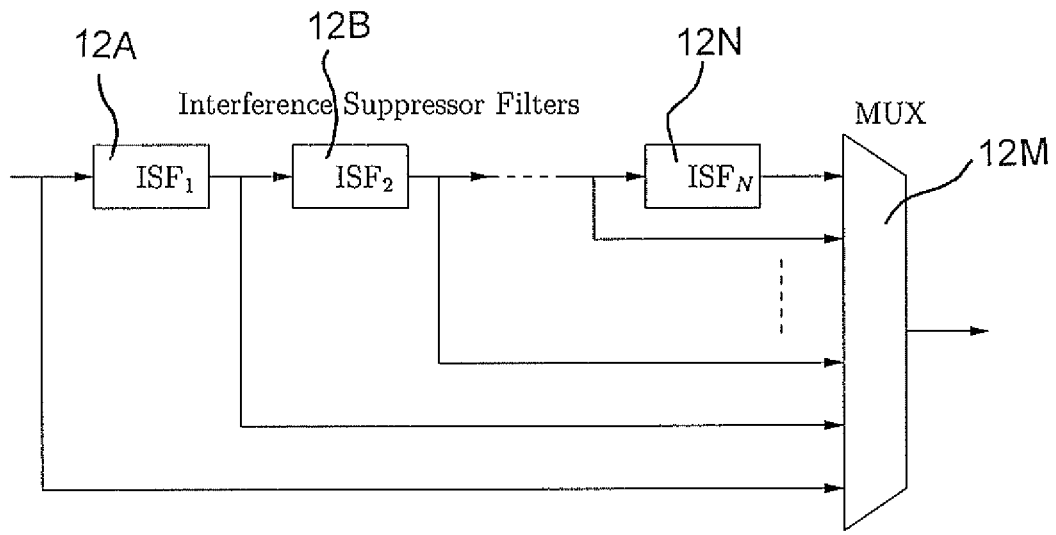
FIG. 2 is a block diagram of a preferred embodiment of the Programmable Interference Suppressor (PIS) block shown in FIG. 1. The PIS block consists of a cascade of N Interference Suppressor Filter (ISF) blocks, respectively labeled as $ISF_1$, $ISF_2, \ldots, ISF_N$.

Referring to FIG. 2, the PIS block 12 in FIG. 1 consists of a cascade of N Interference Suppressor Filter (ISF) blocks 12A to 12N, labeled as, $ISF_1, ISF_2, \ldots, ISF_N$. An ISF block removes one of the interferences. A cascade of N ISF blocks allow to remove N interferences. A mux indicated at 12M is configured so the PIS block 12 suppresses either $0, 1, 2, \ldots$, N interferences.

Figure 3:
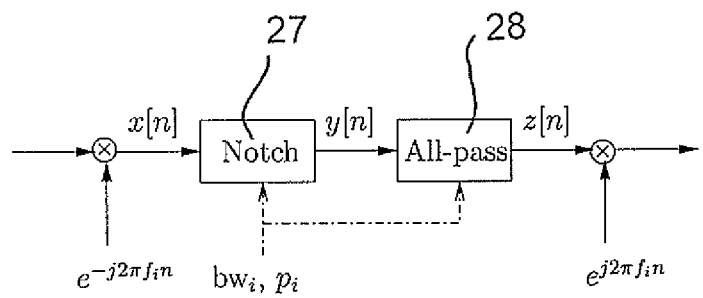
FIG. 3 is a block diagram of a preferred embodiment of the Interference Suppressor Filter (ISF) blocks shown in FIG. 2.

Referring to FIG. 3, a preferred embodiment of the ISF blocks shown in FIG. 2, for example block 12A, consists of a cascade of an IIR Notch filter 27 and an IIR all-pass filter 28. The all-pass filter 28 is "matched" to the notch filter 27 in the sense that it compensates for the phase distortions introduced by the notch filter. The interference to be notched, say interference number i, is shifted to DC by multiplying the input signal by the complex operand, $e^{-j2\pi f_i n}$ where fi is an estimate of the center frequency of interference number i, which was provided by the ID block 11 shown in FIG. 1. The all-pass filter output, z[n], is shifted in frequency by multiplying it with $e^{-j2\pi f_i n}$.

The notch filter output, y[n], is given by $$y[n] = x[n] - \sum_{l=1}^{L}(c_l x[n-l] - d_l y[n-l]),$$

where $c_l$ and $d_l$ are real coefficients. Values for $c_l$ and $d_l$ are pre-computed and stored in memory for different ranges of $bw_i$ and $p_i$.

The all-pass filter output, z[n], is given by $$z[n] = \qquad\qquad(1)$$
$$y[n-P] + \sum_{l=0}^{P-1} k_{P-l} y[n-l] - \sum_{l=1}^{P} k_l z[n-l],$$

where $k_l, l=1, \ldots, P$ are real coefficients.

Each notch filter has a corresponding all-pass filter, and thus coefficients $k_l, \ldots, k_P$ of the all-pass filters are pre-computed for each notch filter. The calculation of these coefficients involves the numerical evaluation of an equation that uniquely relates the magnitude and phase of a complex cepstrum signal that is causal. Such equation, which can be found in Section 10.3 of the first edition of the textbook by A. V. Oppenheim, and, R. W. Schafer, "Discrete-Time Signal Processing", Prentice-Hall, 1989, is reproduced as:

$$\log|\hat{C}(e^{j\omega})| = \frac{1}{2\pi} \int_{-\pi}^{\pi} \angle C(e^{j\theta}) \cot\left(\frac{\omega-\theta}{2}\right) d\theta, \qquad(2)$$

where $\hat{C}(e^{j\omega}) = \log|C(e^{j\omega})| + j\angle C(e^{j\theta})$ is the Fourier transform of the complex spectrum, ĉ[n], of a causal sequence, c[n]. Using equation (2), the magnitude of the complex cepstrum signal is evaluated at M evenly spaced frequency points, $0, 2\pi/M, 4\pi/M, \ldots, 2\pi(M-1)/M$, where M>P, after taking $\angle C(e^{j\theta})$ equal to the phase response of the notch filter times a constant. Magnitude and phase vectors of $\hat{C}(e^{j\omega})$ are generated, where the phase vector is obtained by evaluating the phase response of the notch filter times a constant at the same frequency points as the ones used to construct the magnitude vector. Taking the inverse Discrete Fourier Transform of $$\exp\left\{\hat{C}(e^{j\omega})\big|_{\omega=\frac{2\pi m}{M}}\right\}$$

using the magnitude and phase vectors computed previously, produces values for c[n] at n=0, ..., M−1. Coefficients are set equal to $k_l$, ..., $k_P$ are set equal to $k_l$=c[l] for l=1, ..., P.

For the all-pass filter 28 to have a phase response that well approximates the negative of the notch filter phase response requires P to be large. This renders the implementation of the the all-pass filter 28 non practical unless some sort of approximation can be made. For example, P=100 requires 100 multiplications and 200 additions per filter output.

Good approximate values of coefficients $k_l$, l=1, ..., P, are obtained with piecewise linear approximations. If the curve, $k_l$, l=1, ..., P, is linearly approximated by Q segments of equal length where P and Q are chosen such that $$\frac{P}{Q}$$

is an integer, then the coefficients, $k_l$, l=1, ..., P, are approximated by $$\hat{k}_{(i-1)P/Q+n} = a_i(1)n + a_i(2), i=1, \ldots Q, n=1, \ldots, P/Q \quad (3)$$

where $a_i(1)$ and $a_i(2)$ are the coefficients describing segment i, and $a_i(1)$ and $a_i(2)$ are obtained using a least squares method. Also, coefficients, $b_i(1)$ and $b_i(2)$, associated with the Q segments approximating the curve, $k_{P+1-l}$, l=1, ..., P are given by $$b_i(1) = -a_{Q-i-1}(1) \quad (4)$$

$$b_i(2) = \frac{a_{Q-i+1}(1)P}{Q} + a_{Q-i+1}(2)$$

Any combinations of P and Q can be used, the smaller the Q, the better, since the less the number of multipliers and adders are required to implement the IIR all-pass filter.

It is appreciated that the present invention is disclosed using the simplest IIR all-pass filter, which is obtained when Q=1. However, the present invention may also be used for Q>1. The reason for choosing Q=1 is that in practice a single linear approximation does not cause significant performance degradation and the all-pass filter stable.

Figure 4:
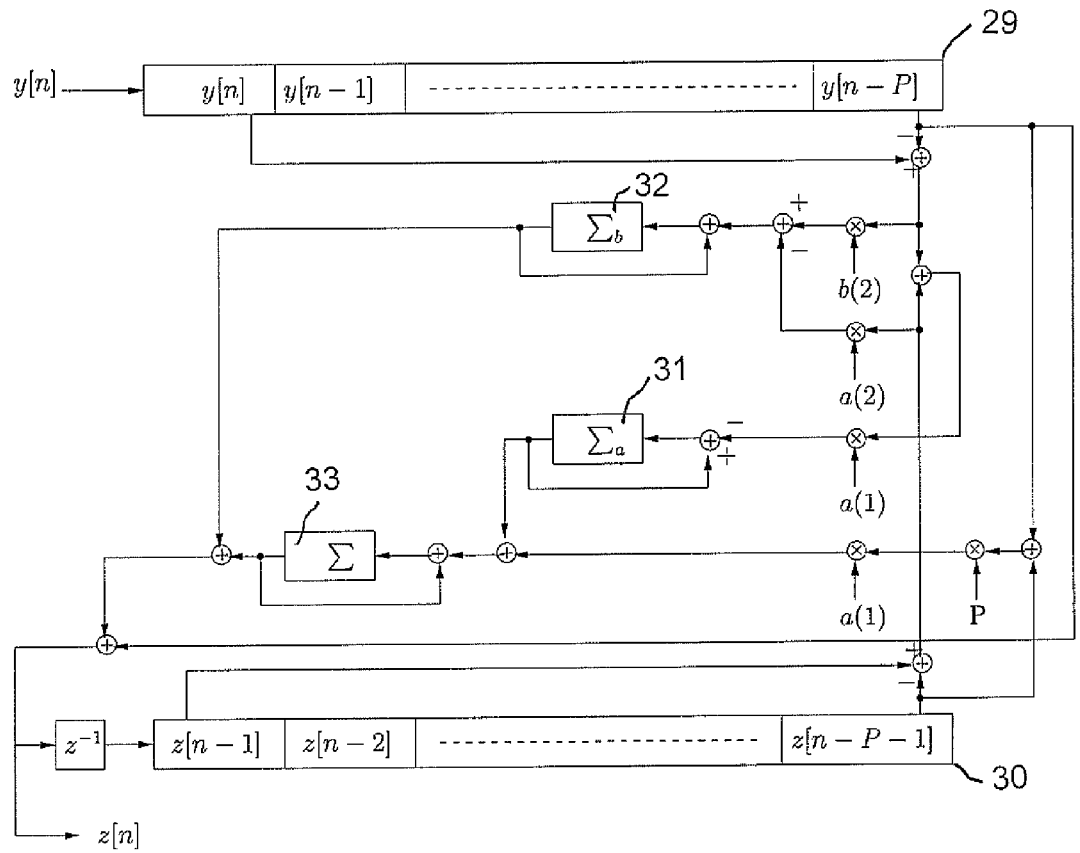
FIG. 4 is a block diagram of a preferred embodiment of the IIR All-pass filter block shown in FIG. 3.

FIG. 4 is a block diagram of the all-pass filter 28 for the case Q=1. If Q=1, the subscript of a and b in (3) and (4) can be dropped for clarity purposes and (3) and (4) become $$\hat{k}_n = a(1)n + a(2), n=1, \ldots, P$$

$$b(1) = -a(1)$$

$$b(2) = a(1)P + a(2)$$

Referring to FIG. 4, input samples y[n], y[n−1], ..., y[n−P] are stored in memory 29 and output samples z[n−1], z[n−2], ..., z[n−P−1] are stored in memory 30, since from (1) they are needed to compute z[n]. Computation of z[n] involves computing the quantities, y[n]$\hat{k}_P$, y[n−1]$\hat{k}_{P-1}$, ..., y[n−P+1]$\hat{k}_l$. But from (5), y[n]$\hat{k}_P$=−y[n]a(1)+y[n]b(2), y[n−1]$\hat{k}_{P-1}$=−2y[n−1]a(1)+y[n−1]b(2), ..., y[n−P+1]$\hat{k}_l$=−Py[n−P+1]a(1)+y[n−P+1]b(2). Quantities y[n]b(2) and −y[n]a(1) are computed upon reception of a new sample, y[n].

Referring to FIG. 4, quantity −a(1)×(y[n]+y[n−1]+ ... +y[n−P+1]), is stored in accumulator $$\sum_a,$$

indicated at 31 and quantity, b(2)×(y[n]+y[n−1]+ ... +y[n−P+1]), is stored in accumulator $$\sum_b$$

indicated at 32. This is made possible by updating accumulators $$\sum_a \text{ and } \sum_b$$

upon reception of a new sample y[n], where the update consists of adding the quantities −y[n]a(1) and y[n]b(2) to accumulators $$\sum_a \text{ and } \sum_b,$$

and subtracting the quantities, −y[n−P]a(1), and, y[n−P]b(2) from accumulators $$\sum_a \text{ and } \sum_b.$$

Similarly, computation of z[n] involves computing the quantities z[n−1]$\hat{k}_1$, z[n−2]$\hat{k}_2$, ..., z[n−P]$\hat{k}_P$. But from (5), z[n−1]$\hat{k}_1$=z[n−1]a(1)+z[n−1]a(2), z[n−2]$\hat{k}_2$=2z[n−2]a(1)+z[n−2]a(2), ..., z[n−P]$\hat{k}_P$=Pz[n−P]a(1)+z[n−P]a(2). Quantities z[n]a(2) and z[n]a(1) are computed upon computation of filter output z[n].

Referring to FIG. 4, quantity a(1)×(z[n]+z[n−1]+ ... +z[n−P]), is stored in accumulator $$\sum_a,$$

and quantity, a(2)×(z[n]+z[n−1]+ ... +z[n−P]), is stored in accumulator $$\sum_b,$$

This is made possible by updating accumulators $$\sum_a \text{ and } \sum_b$$

upon reception of a new sample y[n], where the update consists of adding the quantities z[n−1]a(1) and z[n−1]a(2) to accumulators $$\sum_a \text{ and } \sum_b,$$

and subtracting the quantities, $z[n-P-1]a(1)$, and, $z[n-P-1]a(2)$ from accumulators $$\sum_a \text{ and } \sum_b.$$

Referring again to FIG. 4, the output, $z[n]$, is obtained by adding the content of accumulator, $$\sum_a,$$

to accumulator $\Sigma$ indicated at 33 and summing accumulator $\Sigma$, accumulator $$\sum_b$$

and $y[n-P]$. Also quantity $P \times a(1) \times (-y[n-P]+z[n-P-1])$ must be subtracted from accumulators $\Sigma$.

Figure 5:
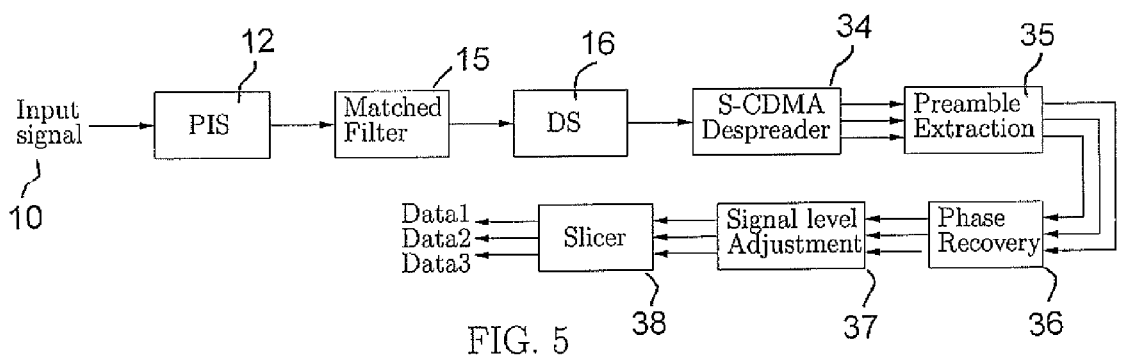
FIG. 5 is a block diagram of a preferred embodiment of the invention which provides a method to suppress the narrow band interferences during the S-CDMA traffic mode including components arranged to extract the preambles after de-spreading the incoming S-CDMA burst, and then synchronize, and recover the data.

Referring to FIG. 5, the input signal 10 consists of an S-CDMA traffic burst, which is typically made of signal bursts transmitted simultaneously from several transmitters using S-CDMA codes. Signal 10 is passed to the PIS block 12, then the matched filter 15 and the down-sampler 16. A S-CDMA despreader block 34 despreads the output of the down-sampler using the S-CDMA codes to extract the signal bursts. This is illustrated in FIG. 5 by showing several arrows leaving the despreader block 34, where each arrow represents a signal burst. The signal bursts (at the symbol rate) are processed to extract their preamble using a preamble extraction block 35. The preambles are then used to recover phase and measure/adjust the level of the signal bursts using a phase recovery block 36 and a signal level adjustment block 37, so the data in each signal burst can be properly recovered using a slicer 38.

The invention claimed is:

1. A method for use in a receiver of a communication system for suppressing one or more narrow band interferences present in a communication channel, the method comprising:
   receiving at the receiver a communication signal from the communication channel;
   filtering in the communication signal each narrow band interference to be suppressed in turn with a respective one of a plurality of Infinite Impulse Response (IIR) notch filters configured to suppress a respective one of the narrow band interferences;
   providing a Decision Feedback Equalizer (DFE) to provide compensation for distortions introduced by the plurality of IIR notch filters, wherein equalization of the communication channel is isolated or decoupled from the suppression of the narrow band interferences; and
   providing for each of the plurality of IIR notch filters prior to said DFE a respective one of a plurality of IIR all-pass filters devised to compensate for phase distortions introduced by a respective notch filter, to minimize the distortions introduced by each of the plurality of IIR notch filters to the communication signal prior to said DFE.

2. The method according to claim 1 wherein the communication channel is shared by a plurality of transmitters by using Time Division Multiple Access (TDMA) scheme.

3. The method according to claim 1 wherein there is provided an algorithm to detect the narrow band interferences in the communication channel, and configure the plurality of IIR notch filters to suppress the detected narrow band interferences.

4. The method according to claim 3 wherein the algorithm comprises Fast Fourier Transforms, frequency interpolations, filtering, down-sampling, and up-sampling operations.

5. The method according to claim 1 including isolating or decoupling equalization of the communication channel from suppression of the respective one of the narrow band interferences.

6. The method according to claim 1 wherein the communication system is a Cable Television (CATV) network having a plurality of Cable Modems for communicating data in a return path and the method operates on the return path to suppress narrow band interferences that enter the return path through defective shields.

7. A method for use in a receiver of a communication system for suppressing one or more narrow band interferences present in a communication channel, the method comprising:
   receiving at the receiver a communication signal from the communication channel;
   filtering in the communication signal each narrow band interference to be suppressed in turn with a respective one of a plurality of Infinite Impulse Response (IIR) notch filters configured to suppress a respective one of the narrow band interferences; and
   providing for each of the plurality of IIR notch filters a respective one of a plurality of IIR all-pass filters devised to compensate for phase distortions introduced by a respective IIR notch filter;
   wherein an equalization of the communication channel is isolated or decoupled from the suppression of the respective one of the narrow band interferences by using an adaptive equalizer in the receiver wherein during a training mode, a desired response of the adaptive equalizer is a replica of the communication signal if only distorted by the plurality of IIR notch filters and the plurality of IIR all-pass filters.

8. The method according to claim 7 wherein the communication signal is distorted using a pre-equalizer of a transmitter to cancel effects of the communication channel at the receiver, and the adaptive equalizer in the receiver is used to compute coefficients of the pre-equalizer of the transmitter.

9. The method according to claim 7 wherein the communication system is a Cable Television (CATV) network having a plurality of Cable Modems for communicating data in a return path and the method operates on the return path to suppress narrow band interferences that enter the return path through defective shields.

10. The method according to claim 7 wherein the communication channel is shared by a plurality of transmitters by using Time Division Multiple Access (TDMA) scheme and wherein a Decision Feedback Equalizer (DFE) is used to compensate distortions introduced by the plurality of IIR notch filters not compensated by the plurality of IIR all-pass filters.

11. The method according to claim 7 wherein the communication channel is shared by a plurality of transmitters by using Synchronous Code Division Multiple Access (S-CDMA) scheme.

12. The method according to claim 7 wherein there is provided an algorithm to detect the narrow band interferences in the communication channel, and configure the IIR notch filters to suppress the detected narrow band interferences.

13. The method according to claim 12 wherein the algorithm comprises Fast Fourier Transforms, frequency interpolations, filtering, down-sampling, and up-sampling operations.

14. A method for use in a receiver of a communication system for suppressing one or more narrow band interferences present in a communication channel, the method comprising:
  receiving at the receiver a communication signal from the communication channel;
  filtering in the communication signal each narrow band interference to be suppressed in turn with a respective one of a plurality of Infinite Impulse Response (IIR) notch filters configured to suppress a respective one of the narrow band interferences;
  providing a Decision Feedback Equalizer (DFE) to provide compensation for distortions introduced by the plurality of IIR notch filters, wherein a training sequence is used for equalizing the communication channel; and
  providing for each of the plurality of IIR notch filters prior to said DFE a respective one of a plurality of IIR all-pass filters devised to compensate for distortions introduced by a respective notch filter, to minimize the distortions introduced by each of the plurality of IIR notch filters to the communication signal prior to said DFE.

15. The method according to claim 14 wherein the communication channel is shared by a plurality of transmitters by using Time Division Multiple Access (TDMA) scheme.

16. The method according to claim 14 wherein there is provided an algorithm to detect the narrow band interferences in the communication channel, and configure the plurality of IIR notch filters to suppress the detected narrow band interferences.

17. The method according to claim 16 wherein the algorithm comprises Fast Fourier Transforms, frequency interpolations, filtering, down-sampling, and up-sampling operations.

18. The method according to claim 14 including isolating or decoupling equalization of the communication channel from suppression of the respective one of the narrow band interferences.

\* \* \* \* \*